United States Patent Office 3,471,480
Patented Oct. 7, 1969

3,471,480
PROCESS FOR THE MANUFACTURE OF 3-SUB-
STITUTED Δ⁵-6-METHYL-STEROID COMPOUNDS
Werner Fritsch, Neuenhain, Taunus, and Ulrich Stache,
Hofheim, Taunus, Germany, assignors to Farbwerke
Hoechst Aktiengesellschaft vormals Meister Lucius &
Brüning, Frankfurt am Main, Germany, a corporation
of Germany
No Drawing. Continuation-in-part of application Ser. No.
468,597, June 30, 1965. This application Jan. 24, 1968,
Ser. No. 700,005
Claims priority, application Germany, June 30, 1964,
F 43,305; Aug. 1, 1964, F 43,642
Int. Cl. C07c *167/00, 169/50, 173/00*
U.S. Cl. 260—239.55                      6 Claims

---

ABSTRACT OF THE DISCLOSURE

A process for preparing 3-substituted-Δ⁵-6-methyl-
steroids by reacting triphenyl-phosphine-methylene with
3,5-cyclo-6-oxo-steroids and adding an organic or halogen
acid, an alcohol, or water to the compounds thus
obtained. The resulting compounds have physiological
activity increased in comparison with corresponding
progestational agents not having a 6-methyl group.

---

This application is a continuation-in-part of applica-
tion Ser. No. 468,597 filed June 30, 1965, now abandoned.

The present invention relates to a novel process for
preparing 3-substituted Δ⁵-6-methyl-steroid compounds.

It is already known that oxo-groups in various steroid
compounds according to G. Wittig [Chem. Ber. 87,
1318 (1964)] can be converted by means of triphenyl-
phosphine-methylene into the corresponding methylene-
steroid compounds (cf. F. Sondheimer and R. Mechou-
lam, J. Amer. Chem. Soc., 79, 5029 (1957)).

Now we have found that Δ⁵-6-methyl-steroid deriva-
tives can be prepared by reacting 6-oxosteroids of the
3,5-cyclo series with triphenylphosphine-methylene and
by adding on the 3,5-cyclo-6-methylene-steroids thus
obtained hydrohalic acids, organic carboxylic acids, alco-
hols or water, and, if desired, acylating a 17-hydroxy
group present. The corresponding 3-halogen-, 3-acyloxy-,
3-alkoxy- and 3-hydroxy-Δ⁵-6-methyl-steroids are obtained
while a Δ⁵-double linkage is formed.

Triphenyl-phosphine-methylene is obtained in situ
according to the known process by G. Wittig (Ber. 87,
1318 (1964)) or according to a process recently modi-
fied by E. J. Corey (J. Org. Chem., 28, 1128 (1963)).
The 3,5-cyclo-6-oxo-steroid compounds are reacted with
triphenyl-phosphine-methylene thus obtained in order to
obtain the corresponding 3,5-cyclo-6-methylene-steroid
compounds without giving rise to a modification of the
otherwise unstable 3,5-cyclopropane ring of the steroid.

The 3,5-cyclo-6-methylene-steroid compounds thus pre-
pared add hydrohalic acids, organic carboxylic acids,
alcohols and water in a very simple and smooth reaction
on the 3,5-cyclo-6-methylene system. Thereby, the rad-
icals such as —I, —Br, Cl, —O—COH, —OCOCH₃,
O—COOH₂CH₃, O—COCH₂CH₂CH₃, O-alkyl, O-cyclo-
alkyl, O-aralkyl, —OH are added on the C₃-atom.
The remaining protones are, however, not added on
the C₅-atom but—this being surprising—on the C-atom
of the 6-methylene group. With formation of a Δ⁵-double
linkage, a rearrangement takes place whereby the corre-
sponding 3β-halogen-, 3β-acyloxy-, 3β-alkoxy- and
3-β-hydroxy-Δ⁵-6-methylsteroid compounds are obtained
in very good yields.

The stages of the reaction performed according to
the process of preparing Δ⁵-6-methyl-steroids in con-
formity with the present invention occur according to
the following scheme:

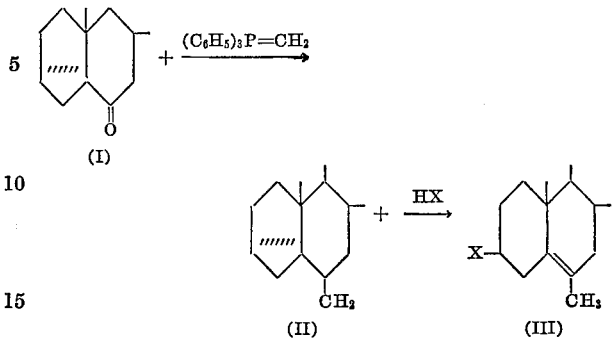

wherein X represents Cl, Br, I, O-acyl, O-alkyl, O-cyclo-
alkyl, O-aralkyl or OH.

The 3,5-cyclo-6-oxo-steroids required as starting sub-
stances for the process of the present invention are pre-
pared according to known methods. Carbonyl functions
in other positions of the steroid molecule have to be
protected by ketalization on an appropriate reaction
stage. If certain reaction conditions are taken into
account, hydroxy and ether groups do not affect the
reaction forming the olefinic bond. (J. Am. Chem. Soc.,
79, 5029 (1957).) As starting substances there are men-
tioned in particular 3,5-cyclo-6-oxo-androstanes and
3,5-cyclo-3-oxo-pregnanes, such as, for instance:

3,5-cyclo-6-oxo-17-ethylene-dioxy-androstane,
3,5-cyclo-6-oxo-17α-methyl-androstane-17-ol,
3,5-cyclo-6-oxo-17α-methyl-20-ethylenedioxy-pregnane,
3,5-cyclo-6-oxo-17α-vinyl-androstane-17-ol,
3,5-cyclo-6-oxo-17α-ethinyl-androstane-17-ol,
3,5-cyclo-6-oxo-19-nor-17-ethylenedioxy-androstane,
3,5-cyclo-6-oxo-19-nor-17α-methyl-androstane-17-ol,
3,5-cyclo-6-oxo-19-nor-17α-vinyl-androstane-17-ol,
3,5-cyclo-6-oxo-19-nor-17α-ethinyl-androstane-17-ol,
3,5-cyclo-6-oxo-25D-spirostane,
3,5-cyclo-6-oxo-17α,20,20,21-bismethylene-dioxy-
  pregnane,
3,5-cyclo-6-oxo-17α,20,20,21-bismethylene-dioxy-Δ⁹⁽¹¹⁾-
  pregnene,
3,5-cyclo-6-oxo-20-ethylenedioxy-pregnane,
3,5-cyclo-6-oxo-Δ¹⁶-20-ethylenedioxy-pregnene,
3,5-cyclo-6-oxo-17α-hydroxy-20-ethylenedioxy-pregnane,
3,5-cyclo-6-oxo-20-ethylenedioxy-pregnane-11β,17α-diol,
3,5-cyclo-6-oxo-9α-halogen-20-ethylenedioxy-pregnane-
  11β,17α-diol.

Instead of the ethylene-ketals, other ketals such as for
instance, the neopentyl-ketals of said steroid derivatives
can likewise be used. The 3,5-cyclo-6-oxo-steroid deriva-
tives used as starting materials can be prepared according
to generally known processes. After protection of ketone
functions present in other positions of the steroid mole-
cule, for instance in 17- or 20-position, according to gen-
erally known methods by reaction with ethylene-glycol
as ethylene-dioxy-groups, the 3β-hydroxy-Δ⁵-steroid de-
rivatives are reacted with tosyl-chloride or mesyl-chloride
in pyridine in order to obtain the corresponding 3β-tosyl-
Δ⁵-steroids or 3β-mesyl-Δ⁵-steroids. These are subjected to
homo-allyl-rearrangement with alkali metal acetates in a
mixture of acetone and water. The 3,5-cyclo-6β-hydroxy-
steroid derivatives thus obtained are oxidized with chromic
acid in pyridine or with tetraacetate of lead to the 3,5-
cyclo-6-oxo-steroid derivatives used as starting substances.

The first reaction stage of the process comprises the
preparation of the triphenyl-phosphine-methylene from
1–5 mol-equivalents of methyl-triphenyl-phosphonium-
bromide according to G. Wittig (Ber. 87, 1318 (1954))

with an equimolar amount of lithium-butyl or lithium-phenyl as base in ether, or according to E. J. Corey (J. Org. Chem. 28, 1128 (1963)) with an equimolar amount of sodium-methyl-sulfinyl-methylide as base in dimethyl-sulfoxide or likewise tetrahydrofurane. The triphenyl-phosphine-methylene reacts with 1 mol-equivalent of the 3,5-cyclo-6-oxo-steroid used, thus forming the 3,5-cyclo-6-methylene-steroid derivative. When operating according to the first mentioned method, the 3,5-cyclo-6-oxo-steroid and the ylene component are boiled for 2 to 10 hours in ether or tetrahydrofurane as solvent; when operating according to the last mentioned method, the components are stirred for a period ranging between 15 minutes and 10 hours at a temperature between 0 and 100° C. in dimethyl-sulfoxide or tetrahydrofurane as solvent, preferably for 5 hours at 60° C. (bath temperature). In both cases, the reaction products are isolated in pure form by chromatographic separation. According to both methods, the yields generally amount to about 70 to 90% of the theory.

In the second reaction phase the 3,5-cyclo-6-methylene steroid obtained is treated with anhydrous hydrohalic acids or with aqueous solutions of hydrohalic acids, if desired in the presence of inert solvents, preferably miscible with water, according to the type of hydrohalic acids, for 1–300 minutes at a temperature between 0 and 100° C., preferably at the boiling temperature of the solvents used, or at room temperature. As solvent there may be used, for example, acetone, diethyl-ketone, dioxane, benzene or tetrahydrofurane. The yields amount to about 80–100% of the theory.

The reaction with organic carboxylic acids is suitably performed at room temperature or by heating the 6-methylene-steroid for 10–120 minutes in solutions of anhydrous or concentrated organic carboxylic acids, preferably formic acid. The addition may be carried out in the absence or in the presence of a mineral acid as catalyst, for instance sulfuric acid or toluene-sulfonic acid. Acetic acid or longer chain organic carboxylic acids such as propionic acid or butyric acid may likewise be used. If necessary, the solvents used for the addition of hydrogen halide can likewise be used as solvents in the above-mentioned case. The reaction products are obtained in nearly quantitative yield.

The addition of the anhydrous alcohols on the 3,5-cyclo-6-methylene steroids is carried out by heating a solution of the 6-methylene steroid in the alcohol used, the catalytic influence of a strong acid being necessary. As acids of said type there can be used, for instance, concentrated sulfuric acid or p-toluene-sulfonic acid in the absence or the presence of an inert solvent miscible with the alcohol used. As solvents there are mentioned, for instance, benzene, toluene, tetrahydrofurane or ether. For the addition of alcohols the following alcohols can be used: aliphatic alcohols such as lower aliphatic alcohols, for instance, methanol, ethanol, propanol or butanol. It is likewise possible to use higher aliphatic alcohols containing up to about 10 carbon atoms. Cyclopentanol and cyclohexanol are preferred cycloaliphatic alcohols: benzyl alcohol and phenylethyl alcohol are preferred araliphatic alcohols.

The addition of water to the 3,5-cyclo-6-methylene steroid is attained by heating or boiling a solution of the steroid for 1 to 5 hours or likewise by treatment at room temperature preferably in a solvent miscible with water, under the catalytic influence of an aqueous solution of a mineral acid such as sulfuric acid, phosphoric acid, hydrochloric acid or an organic acid such as benzene-sulfonic acid or toluene-sulfonic acid. When using a mineral acid such as hydrochloric acid which, according to what is said above can likewise react with addition of chlorine in 3-position, care must be taken that the acid is considerably diluted when hydroxy groups are to be added. As solvents, there are used water-soluble solvents mentioned for the addition of halogen halide. The yields amount in this case to about 60–90% of the theory.

In all cases in which the reaction mixture contains water, a ketal group present is simultaneously split into a keto group in the course of the addition reaction. When operating in an anhydrous medium,, the ketal splitting can be carried out according to generally known methods after termination of the addition reaction.

If the products of the invention carry an α- or β-hydroxy-group in 17-position, the latter can be acylated in the usual manner. For this purpose, acetic acid and propionic acid are preferably used, in particular their functional derivatives such, for instance, as anhydrides or halides.

It is known that 6-methyl-steroid compounds show a considerably increased physiological action on the steroids not containing a 6-methyl group on which they are based [cf. J. Org. Chem. 26, 269 (1961)]. The $\Delta^5$-6-methyl steroids obtained according to the process of the present invention, are known in the art (cf. U.S. Patent 3,071,581 and British Patents 840,477 and 852,683). Such compounds, for instance those in the 17α-hydroxy-pregnene series in the form of their 17α-acyloxy-derivatives, are likewise physiologically active compounds or serve as starting materials for other physiologically active 6-methyl-steroids.

The following examples serve to illustrate the invention but they are not intended to limit it thereto:

EXAMPLE 1

3,5-cyclo-6-methylene-17-ethylenedioxy-androstane

At first, a solution of 0.012 mol of sodium-methyl-sulfinyl-methylide in dimethylsulfoxide is prepared by adding—with exclusion of humidity and in a nitrogen atmosphere—10 milliliters of absolute dimethylsulfoxide to 280 milligrams of very pure sodium hydride (0.012 mol) and by stirring the mixture for 40 minutes in an oil bath at a temperature of 70–80° C. until the evolution of hydrogen is terminated. A lukewarm solution of 4.5 grams of triphenylmethylphosphonium bromide (=0.013 mol) in 15 ml. of absolute dimethylsulfoxide is then dropped into the cooled reaction mixture, and the solution is stirred for 25 minutes at room temperature. To the red-brown ylene-solution a solution of 2.98 g. of 3,5-cyclo-6-oxo-17-ethylendioxy-androstane (=0.0091 mol) in 20 ml. of absolute tetrahydrofurane is added, the solution is stirred for 15 minutes until the positive evolution of heat occurring at the beginning diminishes, and then for 4½ hours at an oil bath temperature of 60° C. under an atmosphere of nitrogen. The reaction mixture is then cooled, poured on water, extracted several times with acetic ester and the combined organic extracts are washed with dilute aqueous sodium-hydrogen-carbonate solution and water. Upon adsorption of the solvent, a crystalline residue remains behind which is chromatographically separated on aluminum oxide (according to Brockmann of "Merck"; column measures: $h=53$ cm., diameter=3 cm.). The adsorption is carried out by means of a mixture of petroleum ether and benzene (1:1). Extraction is at first effected by means of 1300 ml. of petroleum ether, then by means of 300 ml. of benzene. After elimination of the solvent of the benzene extract by distillation, a clear oil is obtained, which upon cooling completely crystallizes. 2 grams of 3,5-cyclo-6-methylene-17-ethylene-dioxy-androstane are obtained in the form of fine white crystals which are recrystallized from a small amount of petroleum ether. Melting point: 98° C.

3β-iodo-$\Delta^5$-6-methyl-17-oxo-androstene 55 mg. of 3,5-cyclo-6-methylene-17-ethylenedioxy-androstane are dissolved in 4 ml. of absolute acetone and 0.1 ml. of an aqueous solution of hydrogen iodide of 57% strength ("Merck") is added. After standing for some minutes at room temperature, a crystalline magma is obtained which is again dissolved by heating. The substance is left for 10 minutes at room temperature and then for 90 minutes in the refrigerator. The precipitate that has formed is then filtered off and washed with cold acetone. 55 milligrams of 3β-iodo-Δ⁵-6-methyl-17-oxo-androstene are obtained which melt at 151–152° C.

EXAMPLE 2

3β-chloro-Δ⁵-6-methyl-17-oxo-androstene (a) To a solution of 300 milligrams of 3,5-cyclo-6-methylene-17-ethylene-dioxy-androstane, prepared as described in Example 1, in 10 ml. of absolute acetone 0.3 ml. of aqueous hydrochloric acid of 36% strength is added, and the whole is boiled for 4 hours under reflux. After cooling, 15 ml. of water are added, the precipitated crystalline needles are filtered off, washed with water until showing a neutral reaction, and dried under reduced pressure.

284 mg. of 3β-chloro-Δ⁵-6-methyl-17-oxo-androstene are obtained which are recrystallized from a mixture of acetone and methanol. Melting point: 177–179° C.

(b) To a solution of 200 mg. of 3,5-cyclo-6-methylene-17-ethylene-dioxy-androstane, prepared as described in Example 1, in 7 ml. of acetone, 0.2 ml. of an aqueous hydrochloric acid of 36% strength is added, and the whole is abandoned for 20 hours at room temperature. 15 milliliters of water are then added, the precipitated crystallizate is filtered off and recrystallized from a mixture of acetone and n-hexane.

170 mg. of 3β-chloro-Δ⁵-6-methyl-17-oxo-androstene are obtained. Melting point: 177–179° C.

EXAMPLE 3

3β-formoxy-Δ⁵-6-methyl-17-oxo-androstene 250 mg. of 3,5-cyclo-6-methylene-17-ethylenedioxy-androstane, prepared as described in Example 1, are dissolved in 1.25 ml. of formic acid of 98–100% strength and heated for 40 minutes on the steam bath. After cooling, the solution is poured on 20 ml. of water, rinsed with a small amount of acetone, the crystalline precipitate that has formed is filtered off, washed with water until it shows a neutral reaction and dried under reduced pressure. 222 milligrams of 3β-formoxy-Δ⁵-6-methyl-17-oxo-androstene are obtained in the form of white crystals, which are recrystallized from a small amount of acetone and methanol. Melting point: 159–160° C.

EXAMPLE 4

3β-hydroxy-Δ⁵-6-methyl-17-oxo-androstene

To a solution of 300 mg. of 3,5-cyclo-6-methylene-17-ethylenedioxy-androstane, prepared as described in Example 1 in 10 ml. of absolute acetone, 1.25 ml. of aqueous sulfuric acid of 35% strength is added and the whole is boiled for 3 hours under reflux and in an atmosphere of nitrogen. The reaction mixture is then poured onto water, the crystalline white precipitate that has formed is filtered off, washed with water until it shows a neutral reaction and dried under reduced pressure.

230 mg. of 3β-hydroxy-Δ⁵-6-methyl-17-oxo-androstene are obtained in the form of fine white needles by recrystallization from a mixture of acetone and petroleum ether. Melting point: 140–141° C.

EXAMPLE 5

(a)(1) 3,5-cyclo-6-methylene-17-α-hydroxy-20-ethylene-dioxy-pregnane

To a sodium-methylsulfinylmethylide solution prepared from 470 mg. of sodium-hydride (0.0195 mol) in 15 ml. of absolute dimethyl-sulfoxide in an atmosphere of nitrogen, a solution of 8 grams of triphenylmethyl-phosphonium bromide (=about 0.025 mol) in 22 ml. of absolute dimethylsulfoxide is added dropwise, the whole is stirred for 30 minutes at an oil bath temperature of 30° C. and a solution of 3.4 grams of 3,5-cyclo-6-oxo-17α-hydroxy-20-ethylene-dioxy-pregnane (=0.0091 mol) in 35 ml. of absolute tetrahydrofurane is then dropped in. The solution is stirred for 4 hours and 30 minutes at a temperature of the oil bath of 60° C. The reaction mixture is then poured onto water, extracted several times by means of ethyl acetate and the combined organic extracts are washed with dilute aqueous sodium-hydrogencarbonate solution and water. After extraction of the solvent, a crystalline residue remains behind which is chromatographically separated on aluminum oxide (Woelm, neutral, Akt.-St. II; column measure: $h=28$ cm., $\phi=3$ cm.). The adsorption is effected by means of a mixture of benzene and petroleum ether (1:1). Extraction is effected with a single 1 liter portion of benzene and two 350 ml. portions of a 3:7 mixture of ether and petroleum ether. After elimination of the solvent of the last extract by distillation, a completely crystallizing oil is obtained. 1.2 grams of 3,5-cyclo-6-methylene-17-hydroxy-20-ethylenedioxy-pregnane are obtained in the form of fine white crystals which are recrystallized from a small amount of petroleum ether. Melting point: 100–102° C.

(a)(2) To a solution of 0.0585 mol of lithiumbutyl in 125 ml. of absolute ether, 25 grams of triphenylmethyl-phosphonium bromide are added portionwise while cooling with ice and stirring in an atmosphere of nitrogen. Stirring is continued for 90 minutes at 20° C. and a solution of 4.6 grams of 3,5-cyclo-6-oxo-17α-hydroxy-20-ethylenedioxy-pregnane in 150 ml. of absolute tetrahydrofurane is then added dropwise while cooling with ice. After stirring for 1 hour at 20° C. the diethyl-ether is distilled off and a further 150 ml. of absolute tetrahydrofurane are added to the reaction mixture. The mixture is then heated to boiling for 9 hours under an atmosphere of nitrogen; after cooling, the dark red reaction mixture is diluted with 1.5 l. of ether, the precipitate that has formed is filtered off, washed thoroughly by means of ether, the combined ethereal filtrates are washed with aqueous common salt solution, dried with sodium-sulfate and the ether is distilled off. A yellow oil is obtained which is boiled out several times with hexane; the hexane of the extracts is distilled off and the light oil obtained is separated on aluminum oxide (Woelm, neutral, Akt.-St. II; column measures: $\phi=3$ cm., $h=28$ cm.). Adsorption and extraction are effected by means of petroleum ether (boiling point 40–60° C.). In the first 700 ml.-fraction, triphenylphosphine compounds are obtained. After elution with a further 7 liters of petroleum ether and after elimination of the solvent by distillation, 3.6 grams of crystalline 3,5-cyclo-6-methylene-17α-hydroxy-20-ethylenedioxy-pregnane are obtained which may be recrystallized from n-hexane. Melting point: 100–102° C.

For the secondary reactions described in the Examples 5b, 5c, 10, 11, 12, 13 the reaction product obtained can be used without having been subjected to chromatographic separation or after a crude purification by filtration with benzene (∼500 ml.) over a small amount of $Al_2O_3$.

The phosphine additions still present after recrystallization of the secondary products remain dissolved in their mother liquors.

(b) 3β-chloro-Δ⁵-6-methyl-17α-hydroxy-20-oxo-pregnene

A solution of 125 mg. of 3,5-cyclo-6-methylene-17α-hydroxy-20-ethylenedioxy-pregnane, prepared as described in Example 5(a), in 5 ml. of absolute acetone is combined with 0.15 ml. of aqueous hydrochloric acid of 36% strength and boiled for 4 hours under reflux. After cooling, 15 ml. of water are added, the separated crystals are filtered off, washed with water until they show a neutral reaction and dried under reduced pressure. 125 milligrams of 3β-chloro-Δ⁵-6-methyl-17α-hydroxy-20-oxo-pregnene are obtained in the form of fine white crystals which are recrystallized from acetone. Melting point: 184–186° C.

For preparing the 17α-acetate a suspension is formed from 1.3 grams of the reaction product thus obtained in 12 ml. of glacial acetic acid and 12 ml. of acetanhydride. After addition of 425 mg. of p-toluenesulfonic acid, the mass is stirred for 3 hours at 20° C., then poured onto water, the crystalline precipitate is filtered off, washed until it shows a neutral reaction and dried over $P_2O_5$. 1.5 grams of 3β-chloro-Δ⁵-6-methyl-17α-acetoxy-20-oxo-pregnene are obtained which are recrystallized from a mixture of acetone and ether. Melting point: 205° C.

(c) 3β-bromo-Δ⁵-6-methyl-17α-hydroxy-20-oxo-pregnene

To a solution of 1.6 grams of 3,5-cyclo-6-methylene-17α-hydroxy-20-ethylenedioxy-pregnane, prepared as described in Example 5(a) in 25 ml. of acetone, 1.1 ml. of aqueous hydrobromic acid of 33% strength are added and the whole is boiled for 4 hours under reflux, or left for 20 hours at 20° C. The substance is worked up as described in Example 6(b). 1.4 grams of crystallized 3β-bromo-Δ⁵-6-methyl-17α-hydroxy-20-oxo-pregnane are obtained which are recrystallized from acetone. Melting point: 170° C.

For preparing the 17α-acetate, a suspension is formed from 1.05 g. of the reaction product thus prepared in 10 ml. of glacial acetic acid. 10 ml. of acetanhydride, 360 mg. of p-toluenesulfonic acid are added, and the whole is stirred for 3 hours at 20° C. The solution is then poured onto water, the formed crystallizate is filtered off, washed until showing a neutral reaction and dried. 1.17 g. of 3β-bromo-Δ⁵-6-methyl-17α-acetoxy-20-oxo-pregnene are obtained which are recrystallized from a mixture of acetone and n-hexane. Melting point: 205° C.

EXAMPLE 6

3β-acetoxy-Δ⁵-6-methyl-17-oxo-androstene (a) 200 mg. of 3,5-cyclo-6-methylene-17-ethylenedioxy-androstane prepared as described in Example 1 are heated with exclusion of humidity for 1 hour on the steam bath in 5 ml. of anhydrous glacial acetic acid to which 1 drop of concentrated sulfuric acid had been added. In order to split off the 17-ethylenedioxy group, 0.1 ml. of water is added, the solution is heated for a further 5 minutes on the steam bath, the reaction mixture is poured onto aqueous saturated sodiumhydrogen-carbonate solution, the crystalline precipitate that has formed is filtered off, washed with water until it shows a neutral reaction and dried under reduced pressure.

140 mg. of 3β-acetoxy-Δ⁵-6-methyl-17-oxo-androstene are obtained in the form of white crystals which are recrystallized from a small amount of acetone and methanol. Melting point 145–146° C.

(b) 200 mg. of 3,5-cyclo-6-methylene-17-ethylenedioxy-androstane prepared as described in Example 1 are dissolved in 5 ml. of glacial acetic acid of 99% strength and 10 mg. of p-toluene-sulfonic acid are added. The substance is allowed to stand for 38 hours at room temperature, the reaction mixture is poured onto water, the separated crystallizate is filtered off and recrystallized from a small amount of acetone and methanol. 180 mg. of 3β-acetoxy-Δ⁵-6-methyl-17-oxo-androstene are obtained. Melting point 145–146° C.

EXAMPLE 7

3β-chloro-Δ⁵-6-methyl-17-oxo-androstene

Into a solution of 200 mg. of 3,5-cyclo-6-methylene-17-ethylene-dioxy-androstane prepared as described in Example 1, in 10 ml. of anhydrous chloroform, carefully dried hydrogen chloride is introduced within 1 hour while stirring, with exclusion of humidity and at 0° C. The reaction mixture is allowed to stand at first for 2 hours at 0° C. and then for 16 hours at 25° C. with exclusion of humidity. The chloroform is then distilled off under reduced pressure. 3β-chloro-Δ⁵-6-methyl-17-ethylenedioxy-androstene is obtained in the form of a white crystalline residue which for the purpose of splitting the ketal is dissolved in 10 ml. of ethanol without further isolation. 7 ml. of water combined with 1 drop of concentrated sulfuric acid are added and the whole is boiled for 3 minutes under reflux. After cooling, the mixture is poured on water, the separated precipitate is filtered off, washed with water until showing a neutral reaction and dried.

145 mg. of 3β-chloro-Δ⁵-6-methyl - 17 - oxo-androstene are obtained which are recrystallized from a mixture of acetone and methanol. Melting point: 177–179° C.

EXAMPLE 8

3β-methoxy-Δ⁵-6-methyl-17-oxo-androstene

A solution of 300 mg. of 3,5-cyclo-6-methylene-17-ethylenedioxy-androstane in 40 ml. of absolute methanol to which 4 drops of concentrated sulfuric acid were previously added is boiled over an atmosphere of nitrogen for 24 hours under reflux. About 30 ml. of methanol are then distilled off, 10 ml. of boiling water are added and the mixture is boiled for 4 minutes under reflux, in order to cleave the ketal. The reaction mixture is then poured on a clear, saturated aqueous sodiumhydrogen-carbonate solution, the white precipitate that has formed is filtered off and washed with water until it shows a neutral reaction.

285 mg. of crystalline 3β-methoxy-Δ⁵-6-methyl-17-oxo-androstene are obtained in the form of coarse white crystals by recrystallization from n-hexane. Melting point: 124–126° C.

EXAMPLE 9

3β-cyclohexoxy-Δ⁵-6-methyl-17-oxo-androstene

A solution of 300 mg. of 3,5-cyclo-6-methylene-17-ethylenedioxy-androstane in 20 ml. of absolute benzene and 20 ml. of absolute cyclohexanol to which 4 drops of concentrated sulfuric acid were previously added is boiled under an atmosphere of nitrogen for 24 hours under reflux. The benzene is then distilled off, 10 ml. of ethanol and 20 ml. of water are added and the mixture is boiled for 5 minutes under reflux in order to split the ketal. The reaction mixture is then poured on a clear saturated aqueous sodiumhydrogen-carbonate solution and ethanol is added until all cyclohexanol is dissolved. A brown oil thereby precipitates which completely crystallizes on standing over night. The brown crystallizate is filtered off, washed with water and after drying under reduced pressure 220 mg. of 3β-cyclohexoxy-Δ⁵-6-methyl-17-oxo-androstene are obtained in the form of brown crystals which in order to be further purified are filtered with benzene as eluant over a small amount of aluminum-oxide ("Woelm" neutral, Akt. St. II). From a mixture of ether and petroleum ether the 3β-cyclohexoxy-Δ⁵-6-methyl-17-oxo-androstene is now obtained in the form of fine while crystals (110 mg.). Melting point: 135–136° C.

EXAMPLE 10

6-methyl-Δ⁵-3β,17α-dihydroxy-20-oxo-pregnene 200 mg. of 3,5-cyclo-6-methylene-17α-hydroxy-20-ethylenedioxy-pregnane, prepared as described in Example 5(a), are dissolved in 8 ml. of acetone and a solution of 300 mg. of p-toluenesulfonic acid in 0.7 ml. of water (or 0.8 ml. of aqueous sulfuric acid of 33% strength) is added. The substance is allowed to stand for 22 hours at room temperature or boiled for 3 hours under reflux, it is poured onto water, the fine crystalline precipitate is filtered off, washed and dried over $P_2O_5$. 170 mg. of crude, finely crystallized 6 - methyl-Δ⁵-3β-17α-dihydroxy-20-oxo-pregnene are obtained which are recrystallized from a mixture of acetone and n-hexane. Melting point: 218–220° C.

EXAMPLE 11

3β-acetoxy-Δ⁵-6-methyl-17α-hydroxy-20-oxo-pregnene 350 mg. of 3,5-cyclo-6-methylene-17α-hydroxy-20-ethylene-dioxy-pregnane are dissolved in 10 ml. of glacial acetic acid and 10 mg. of p-toluenesulfonic acid are added. The mixture is allowed to stand for 40 hours at 20° C., poured onto water, the crystalline precipitate is filtered off, washed and dried. 310 mg. of 3β-acetoxy-Δ⁵-6-methyl-17α-hydroxy-20-oxo-pregnene are obtained which are recrystallized from a mixture of acetone and hexane. Melting point: 137–139° C.

EXAMPLE 12

3β-β-formoxy-Δ⁵-6-methyl-17α-hydroxy-20-oxo-pregnene 350 mg. of 3,5-cyclo-6-methylene-17α-hydroxy-20-ethylenedioxy-pregnane are dissolved in 10 ml. of formic acid and 10 mg. of p-toluenesulfonic acid are added. The mixture is allowed to stand for 40 hours at 20° C., poured onto water, the crystalline precipitate is filtered off, washed and dried. 320 mg. of 3β-formoxy-Δ⁵-6-methyl-17α-hydroxy-20-oxo-pregnene are obtained which are recrystallized from a mixture of acetone and hexane. Melting point: 160–162° C.

EXAMPLE 13

3β-ethoxy-Δ⁵-6-methyl-17α-hydroxy-20-oxo-pregnene

To a solution of 300 mg. of 3,5-cyclo-6-methylene-17α-hydroxy-20-ethylenedioxy-pregnane (prepared as described in Example 5(a)) in 40 ml. of absolute ethanol 3 drops of concentrated sulfuric acid (or p-toluenesulfonic acid) are added and the whole is boiled for 24 hours under reflux and under an atmosphere of nitrogen. 20 ml. of water are then added; the substance is heated for 4 minutes under reflux, in order to hydrolize the 20-ketal group cooled and poured onto water. The crystalline product separating after some time is filtered off, washed and dried. 225 mg. of crystalline 3β-ethoxy-Δ⁵-6-methyl-17α-hydroxy-20-oxo-pregnene are obtained which are recrystallized from a small amount of acetone and hexane. Melting point: 160–162° C.

For preparing the 17α-acetate, a suspension is formed from 900 mg. of the reaction product thus prepared dissolved in 10 ml. of glacial acetic acid and 10 ml. of acetanhydride, 360 mg. of p-toluenesulfonic acid are added, stirring is effected for 3 hours at 20° C., the mixture is poured onto water, and the precipitate is filtered off, washed and dried. 800 mg. of crude yellow crystalline 3β-ethoxy-Δ⁵-6-methyl-17α-acetoxy-20-oxo-pregnene are obtained which, in order to be additionally purified, are filtered with benzene over a small amount of neutral aluminum oxide. The benzene is removed and the reaction product is obtained in the form of white needles after recrystallization from a mixture of acetone and hexane. Melting point: 148–150° C.

We claim:

1. A process for preparing 3-substituted-Δ⁵-6-methyl-pregnenes and -androstenes, which process comprises contacting a 6-oxo-compound of the corresponding 3,5-cyclo-steroid with triphenyl-phosphine-methylene at a temperature between 0° C. and 100° C. in an inert solvent, isolating the corresponding 3,5-cyclo-6-methylene steroid so obtained, and then contacting it with a reagent having the formula HX, wherein X is a member selected from the group consisting of Cl, Br, I, O-acyl, O-alkyl, O-cycloalkyl, O-aralkyl, and OH, said contact being in the presence of an acid when said reagent is not itself an acid, whereby X is added to the 3-position and the 6-methylene group is converted to a 6-methyl group with formation of a Δ⁵-unsaturation.

2. A process as in claim 1 wherein said 6-oxo-compound is contacted with triphenyl-phosphine-methylene in ether or tetrahydrofurane at boiling temperatures for 2 to 10 hours.

3. A process as in claim 1 wherein said 6-oxo-compound is contacted with triphenyl-phosphine-methylene in dimethyl sulfoxide or tetrahydrofurane at a temperature between 0° C. and 100° C. for 15 minutes to 10 hours.

4. A process as in claim 1 wherein said 3,5-cyclosteroid is a pregnane.

5. A process as in claim 1 wherein said 3,5-cyclosteroid is a pregnene.

6. A process as in claim 1 wherein said 3,5-cyclosteroid is an androstane.

References Cited

UNITED STATES PATENTS 3,002,969  10/1961  Petrow et al. _____ 260—239.55

LEWIS GOTTS, Primary Examiner

E. G. LOVE, Assistant Examiner

U.S. Cl. X.R.

260—397.3, 397.4, 397.45, 397.5